(No Model.)

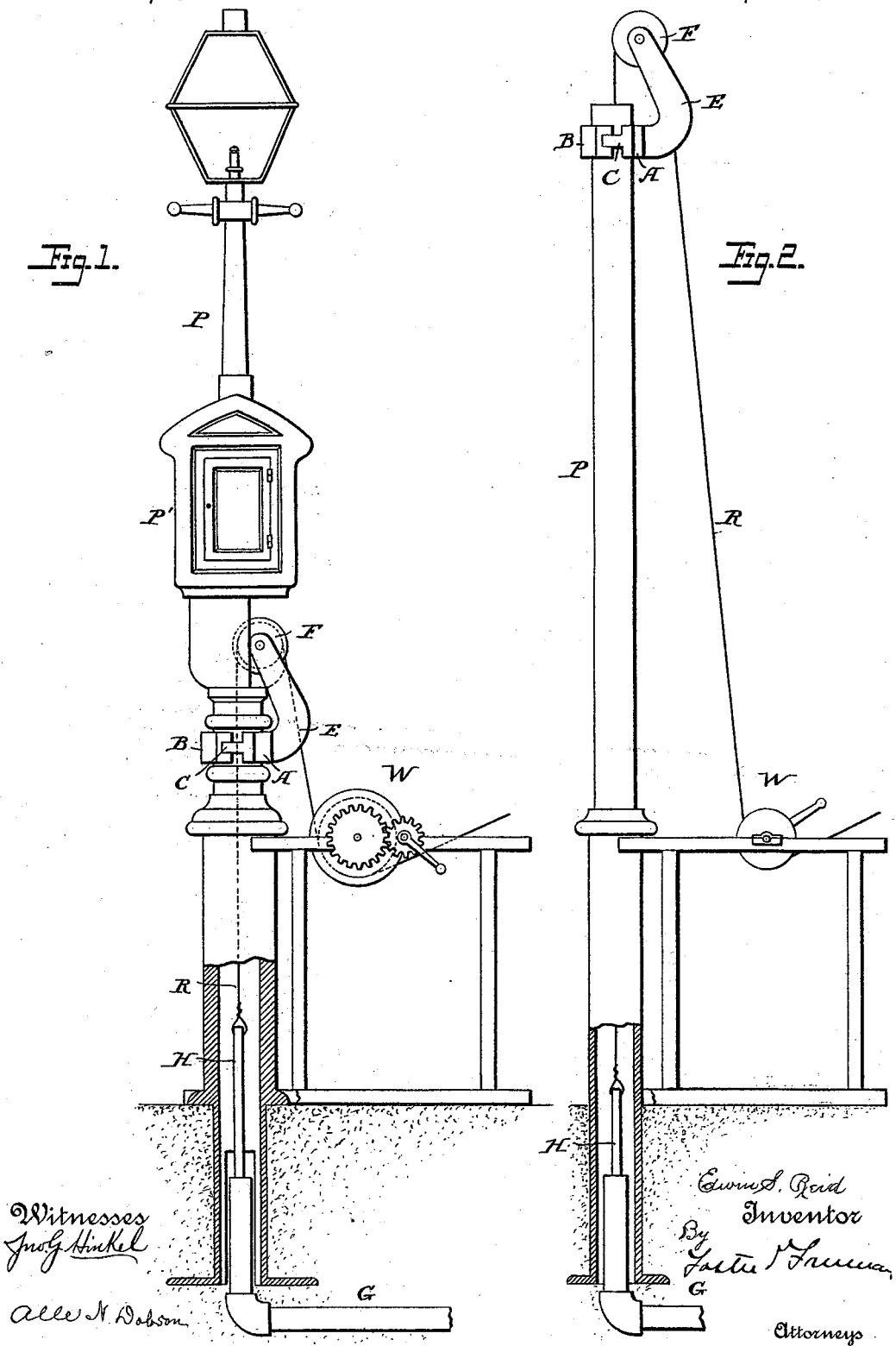

E. S. REID.
APPARATUS FOR PLACING ELECTRIC CABLES.

No. 547,891. Patented Oct. 15, 1895.

2 Sheets—Sheet 2.

Witnesses
Jno. G. Hinkel
Alle N. Dobson

Inventor
Edwin S. Reid
By Foster Freeman
Attorneys

UNITED STATES PATENT OFFICE.

EDWIN S. REID, OF NEW YORK, N. Y., ASSIGNOR TO THE STANDARD UNDERGROUND CABLE COMPANY, OF PENNSYLVANIA.

APPARATUS FOR PLACING ELECTRIC CABLES.

SPECIFICATION forming part of Letters Patent No. 547,891, dated October 15, 1895.

Application filed June 18, 1892. Serial No. 437,211. (No model.)

*To all whom it may concern:*

Be it known that I, EDWIN S. REID, a citizen of the United States, and a resident of New York city, county and State of New York, have invented certain new and useful Improvements in Apparatus for Placing Electric Cables, of which the following is a specification.

My invention relates to apparatus for placing electric cables in lamp-posts, signal-posts, or other hollow structures and the like, and it has for its object to provide means whereby the cables or conductors which are usually arranged in underground conduits can be readily, quickly, and easily applied to the lamp-posts and similar devices; and to these ends my invention consists in the various features of construction, arrangement, and operation of the devices, substantially such as are more particularly hereinafter pointed out.

Figure 3:
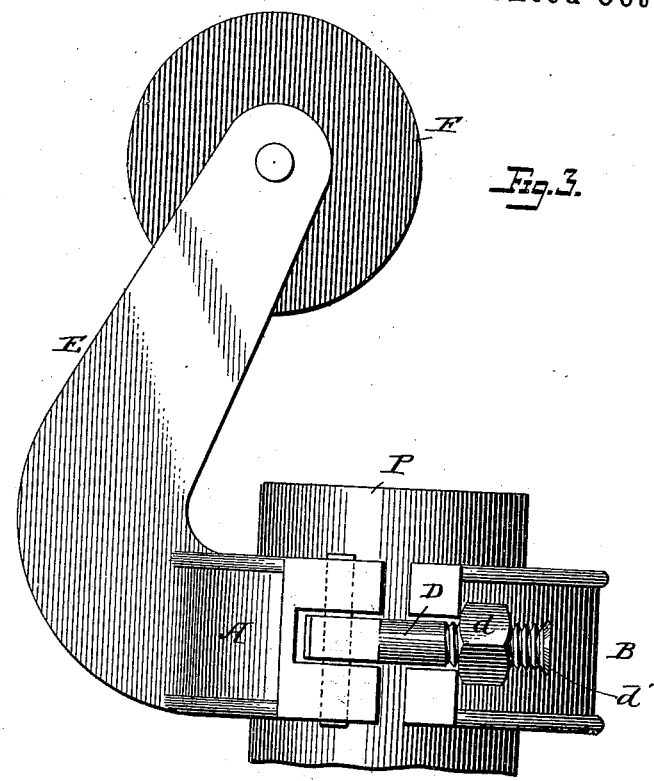
Figure 4:
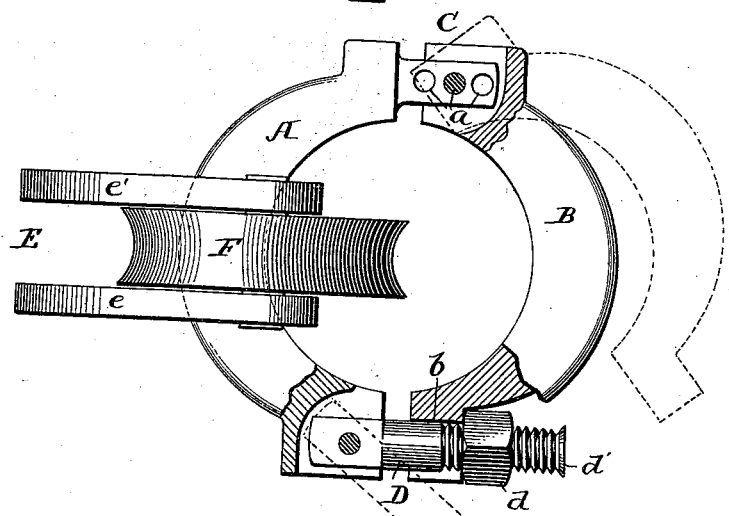

Referring to the accompanying drawings, Figure 1 is a plan view, partly in section, of a lamp-post carrying a fire-alarm-signal box, showing one means of using my invention. Fig. 2 is a side elevation, partly in section, of a lamp-post, showing another way of applying my invention. Fig. 3 is an enlarged side view of the pulley and its attachments, and Fig. 4 is a plan view thereof.

In the large and growing use of underground conduits for electric conductors it is found that new exigencies arise in applying and attaching the cables or conductors, which have to be provided for, and many and various devices have been suggested for the purpose of aiding in introducing the conductors or cables into the conduits and making the connections between the conductors and the various translating devices.

Heretofore when it has been necessary to make an electrical connection between translating devices supported upon a lamp-post, for instance, and the conductor or cable in the conduit it has been a very tedious operation, for while means have been provided for pulling the cables through the conduits no means, so far as I am aware, have been suggested for introducing the conductors into the poles or supports, and this has had to be done by hand, which is a slow, tedious, and expensive job. One of the most common devices for drawing the cable through the conduit is what is known as a "winch," (shown at W, Figs. 1 and 2,) which consists of a drum or cylinder mounted in a suitable frame and provided with gearing whereby the power applied to the driving-crank may be increased and multiplied so as to draw the cable or, what is perhaps more proper, the draw rope which is usually attached to the cable through the conduit, and thereby place the cable in proper position therein. This winch as usually constructed is a somewhat cumbrous device, and is incapable of use by itself in drawing the cable or conductor from the conduit up into a lamp-post, or similar support, so that the proper connection may be made with the translating devices mounted thereon, and it is the object of my present invention to provide means whereby this operation may be conveniently performed, and in which I preferably make use of the usual winch.

In carrying out my invention I provide a device which I have conveniently termed a "post-winch," and which consists, essentially, of a pulley mounted in suitable arms and provided with means whereby it may be quickly and conveniently mounted upon the various posts, so that the pulley will be in a position to properly guide the conductor or cable being drawn into the post, and at the same time allow of power to be applied, so that it can be quickly done.

The post-winch, as shown in Figs. 3 and 4, comprises a collar A B, the part B of which is pivotally attached to the part A by a joint, as C, and this joint is made adjustable, so that the winch can be applied to posts of various sizes. Thus I have shown the pivotal joint as provided with several openings *a*, through which the pivot-pin uniting the parts A and B may be passed. Mounted on the opposite end of the portion A is a pivoted screw-threaded rod D, and the corresponding end of the portion B is slotted, as at *b*, to receive this screw, and mounted on this screw D is a nut *d*, by means of which the parts may be clamped together. The outer ends of the screw D are preferably flanged or headed, as shown at *d'*, so that the nut cannot be entirely withdrawn and thereby lost. It will thus be seen that the clamp can be readily adjusted and secured to posts of different sizes to which the conductors or cables are to be applied, and the parts of the clamp are simple and effective for the purpose set forth. Connected to the clamp and preferably forming a part thereof is the bracket E, which extends upward and inward to a certain extent and forms a pivotal support between the bifurcated portions e e' for the pulley F, and this pulley is so mounted in the bracket that its inner peripheral side is in a line practically over the center of the hollow post, while its outer peripheral side is outside of the post, so that the conductor or cable passing up through the post will be drawn into the post in a central position with relation thereto, while the down-taking portion of the conductor or draw-rope attached thereto will be outside.

In Fig. 1 I have shown an application of my device in which the post P carries a fire-alarm box P', and it is desired to draw the conductor from the conduit-pipe G up into the hollow portion of the post, so that connections may be made between the fire-alarm box and the conductor, and I have shown a draw-rope R as attached to the conductor or cable H and passing up over the pulley F, which is mounted in the bracket E, attached to the body of the post by the clamp A B, and then passing downward to the ordinary winch W, and it will be seen that by applying power to the winch the conductor is readily drawn upward to the desired position in the center of the lamp-post, ready for the connection to be made with the box.

In Fig. 2 I have shown a similar application wherein the bracket and pulley constituting the pole-winch are mounted at the top of the pole and the draw-rope R is attached to the conductor H, as before, and the conductor is represented as being drawn into the pole.

It will be understood that my invention can be used for other purposes than those described—as, for instance, where iron pipes or other hollow structures forming the continuation of either main or subsidiary underground conduits are fastened against a building and into which the cables have to be drawn in the same manner as they are drawn into the lamp-post or hollow pole.

It will be seen from the above that by the use of this simple pole-winch, either in connection with the ordinary winch or not, the conductors can be readily introduced into the post at a great saving of labor and time as well as expense, and when the conductor is properly applied to one post the post-winch can be removed and attached to another post and the operation proceeded with.

What I claim is—

A post winch, comprising a clamp made in sections adjustably connected together and having an adjustable locking device, a bracket attached to the clamp and extending upward, and a pulley supported in the bracket, the inner peripheral sides of which pulley are practically in line with the center of the clamp, the pulley being adapted to be attached to a hollow post and arranged so that a draw-rope passing over said pulley can pass through the center of the post and outside the post, where it may be reeled on an ordinary winch, substantially as described.

In testimony whereof I have signed my name to this specification in the presence of two subscribing witnesses.

EDWIN S. REID.

Witnesses:
GEO. L. WILEY,
T. F. O'CONNOR.